Sept. 29, 1959   L. VISCO ET AL   2,906,419
SELF-LOADING TRUCK
Filed Nov. 13, 1956   4 Sheets-Sheet 2
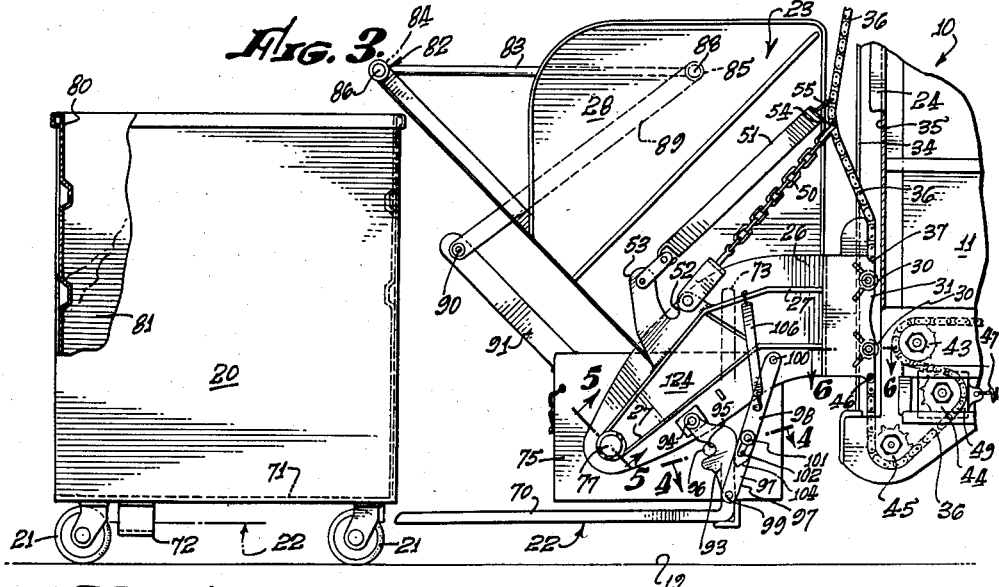
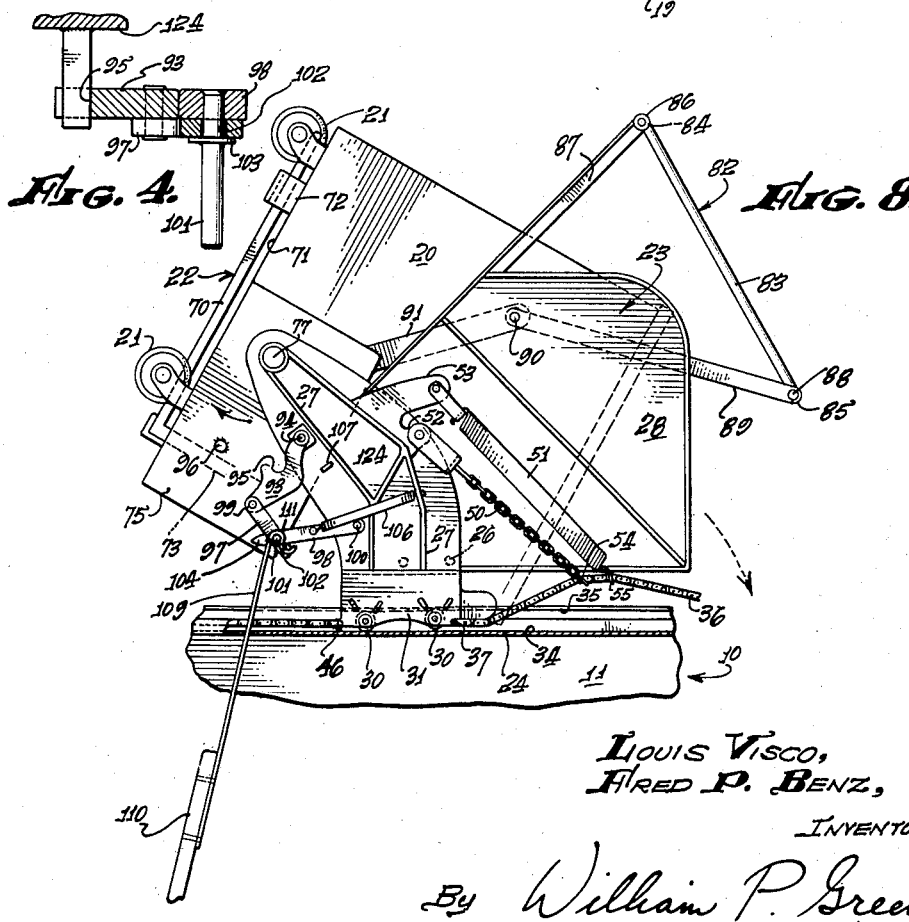
Louis Visco,
Fred P. Benz,
  Inventors.
By William P. Green
  Attorney.

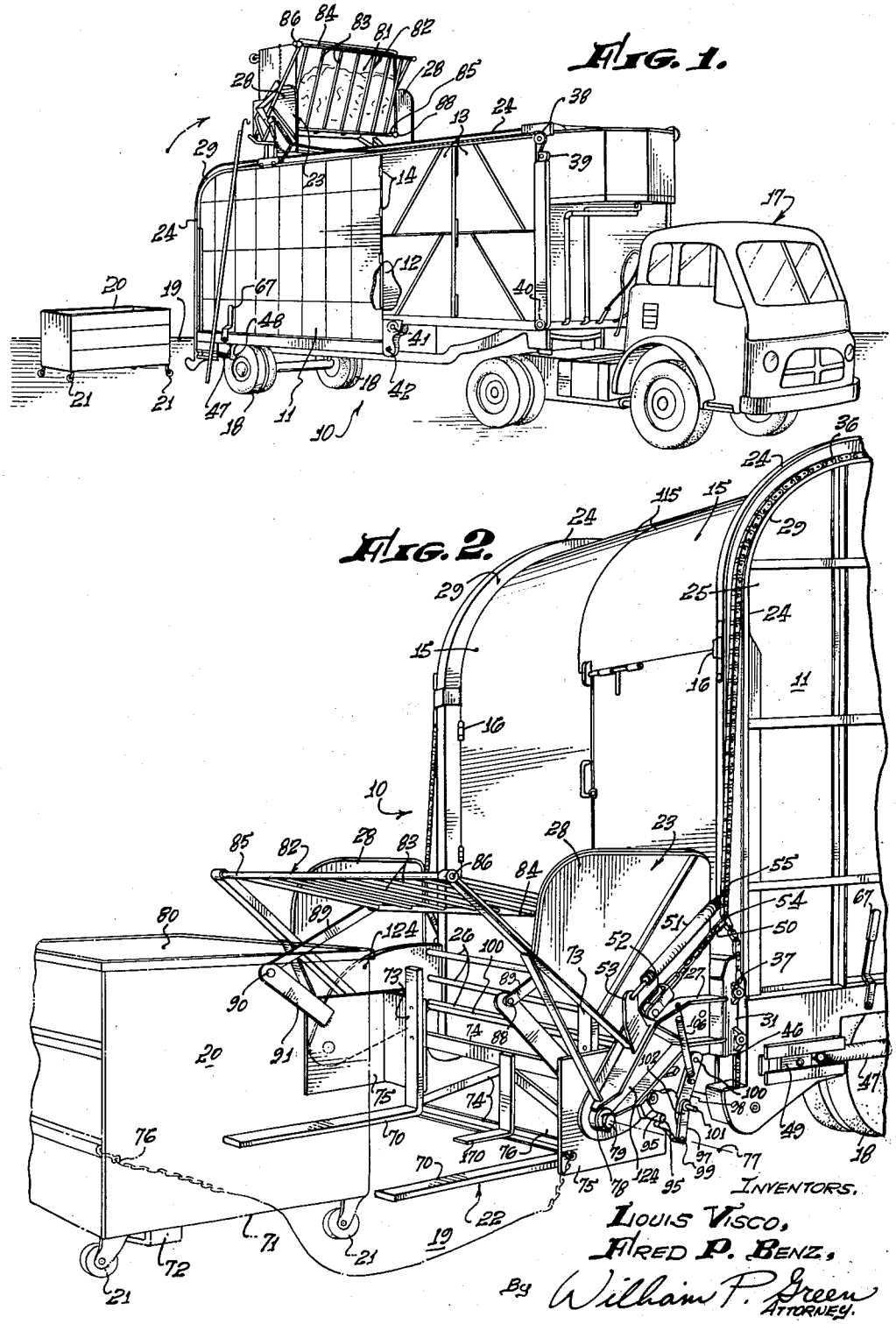

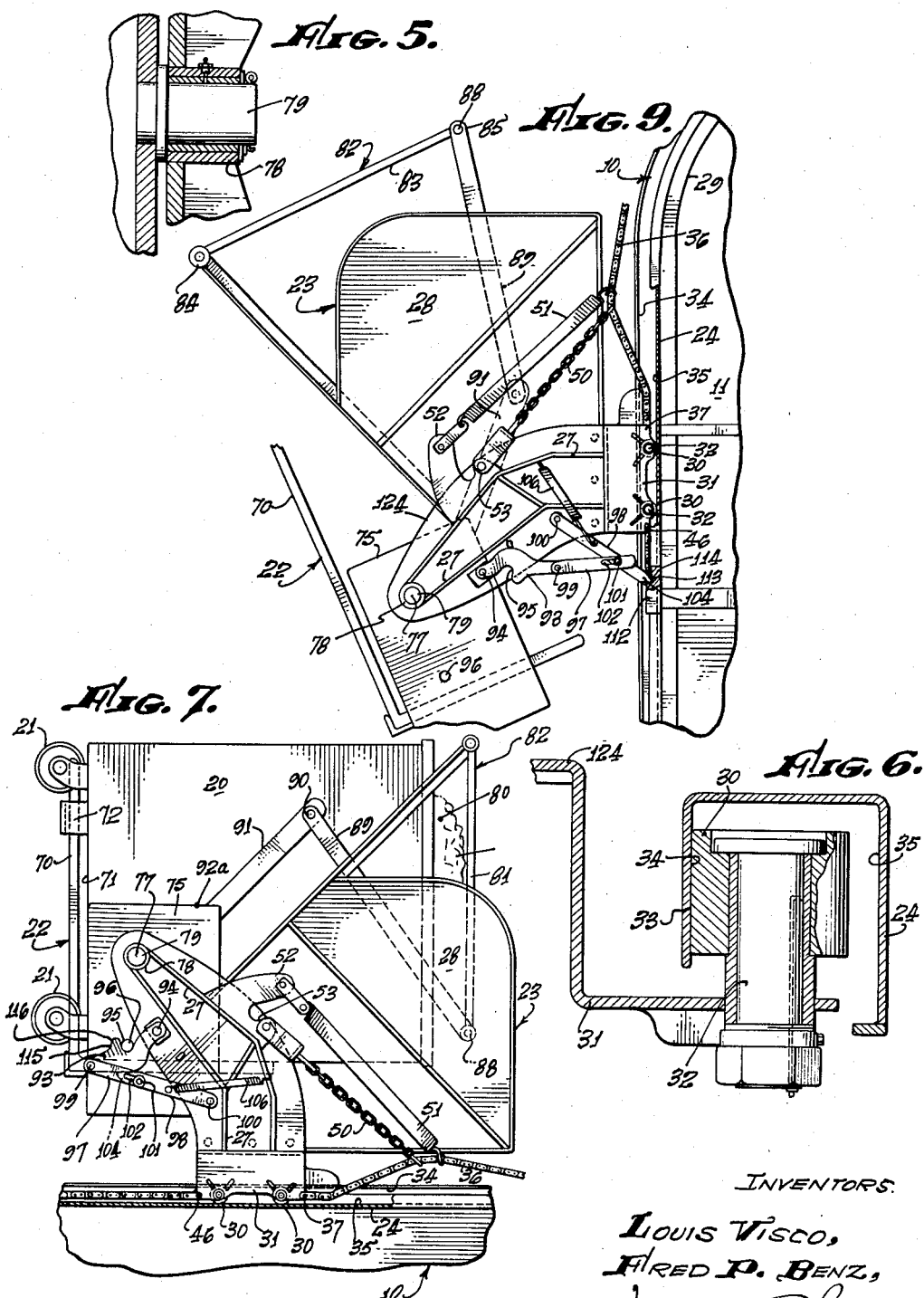

Sept. 29, 1959    L. VISCO ET AL    2,906,419
SELF-LOADING TRUCK
Filed Nov. 13, 1956    4 Sheets-Sheet 4
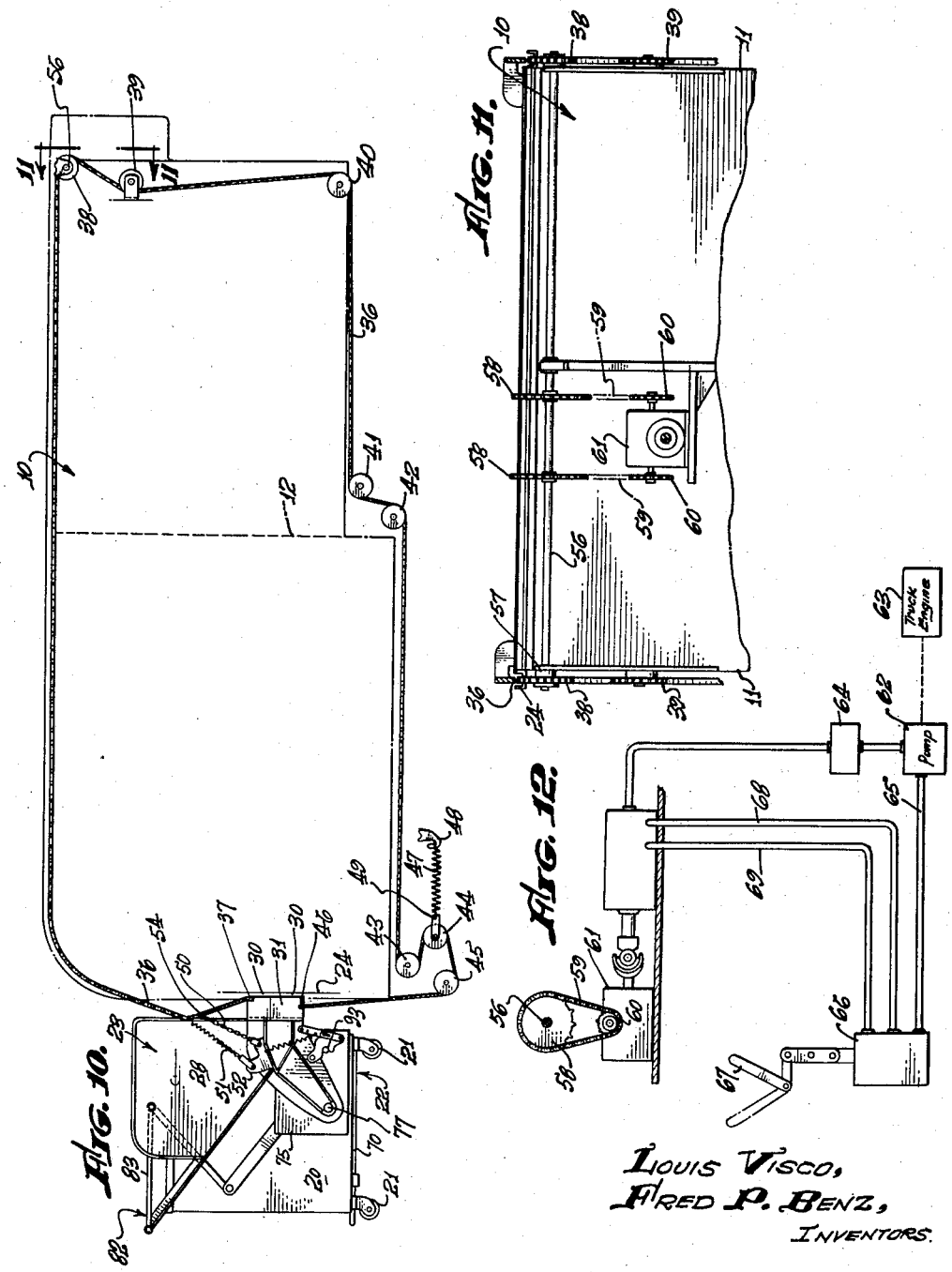
LOUIS VISCO,
FRED P. BENZ,
INVENTORS.
By William P. Green
ATTORNEY.

United States Patent Office 2,906,419
Patented Sept. 29, 1959

2,906,419

SELF-LOADING TRUCK

Louis Visco, Sun Valley, and Fred P. Benz, Saugus, Calif.

Application November 13, 1956, Serial No. 621,610

15 Claims. (Cl. 214—302)

This invention relates to improved trucks for carrying trash or perhaps other load material, and of a type especially designed for very easy loading of the trash into the truck.

A truck embodying the invention includes a carriage which is adapted to receive and carry a container of trash or the like, and which carriage is movable along a track structure on the truck from a pick-up location adjacent the ground to a dumping location at the top of the truck. Preferably, the tracks extend first upwardly at one end of the truck, and then horizontally along the top of the truck body to dump into the truck at any of different dumping locations along its length. A hydraulically actuated endless flexible drive chain or element (desirably a pair of such elements) may be employed for advancing the carriage along the tracks, and may be hydraulically driven for effecting such advancement.

The loading container is preferably adapted to be completely separable from the truck, and to be very easily placed on and removed from the carriage. This allows a number of such containers to be utilized at a desired location or locations as receptacles within which trash or other material may be accumulated over a period of time, and then when the truck comes to those locations at prescribed intervals, the containers themselves may be employed as loading buckets for filling the truck. This minimizes the operations required in loading the truck and thus simplifies the entire pick-up procedure.

Structurally, the carriage may include a rigid frame having wheels or rollers for engaging the track structure as the carriage and a container move toward the upper dumping location. The container is preferably not directly attached to the carriage frame, but instead should be carried by a specially designed holder which is attached to the carriage for relative pivotal movement. The container may be easily movable horizontally onto the holder at the pick-up location, the holder preferably being a fork structure and the container preferably being provided with wheels mounting the container to roll easily along the ground surface to a position of support on the holder.

When the container reaches a desired upper dumping location, the holder and container swing relative to the carriage frame in a manner dumping the contents into the truck. In order to facilitate the dumping action, the pivotal mounting of the holder is so located that, when the carriage is at the pick-up location the container assumes by gravity an upright loading position, and when the carriage is at a dumping position (in which the orientation of the carriage has changed by movement onto a horizontal portion of the track structure), the holder and container then tend to swing by gravity to a changed position relative to the carriage, to thus dump the contents of the load into the truck body. This gravity dumping action may be controlled very easily by means of a latch mechanism acting to prevent the dumping motion of the container, and releasable when desired to permit the dumping action. The latch mechanism should be releasable by an operator at ground level, as by use of an elongated pole having a releasing part at its upper end.

The latch mechanism may include a latch element, which is preferably held in active position by a releasable double link mechanism, which during release acts as a leverage increasing toggle mechanism. One link of this mechanism may also serve to support or brace the carriage in a predetermined position during the time that the truck is travelling between different pick-up or other locations. The particular manner of construction of this latch mechanism is a very important feature of the invention, and will be discussed in greater detail at a later point.

The above and other features and objects of the invention will be better understood from the following detailed description of the typical embodiment illustrated in the accompanying drawings in which Fig. 1 is a perspective view of a truck constructed in accordance with the invention;

Fig. 2 is a fragmentary perspective view of a rear portion of the Fig. 1 truck;

Fig. 3 is an enlarged fragmentary side view of the rear portion of the truck and one of its containers;

Figs. 4, 5 and 6 are enlarged transverse sections taken on lines 4—4, 5—5 and 6—6, respectively, of Fig. 3;

Fig. 7 is a side view showing the movable carriage as it appears when at an upper dumping location;

Fig. 8 is a view similar to Fig. 7, but showing the apparatus as it appears after a dumping operation;

Fig. 9 is a fragmentary side view of the rear portion of the truck, showing the carriage and associated parts in their traveling positions;

Fig. 10 is a somewhat diagrammatic view of the truck, representing the chain-drive arrangement for the movable carriage;

Fig. 11 is an enlarged section taken on line 11—11 of Fig. 10; and

Fig. 12 is a schematic representation of the hydraulic drive system for actuating the movable carriage on the truck.

Referring first to Fig. 1, I have shown at 10 a truck which is, in some respects, especially adapted for receiving and hauling trash, although it will of course be understood that the invention is also applicable to the handling of other types of material if desired. The truck 10 includes a truck body 11 whose walls and floor form a large inner space within the truck body adapted to receive the refuse which is to be hauled. Along its entire upper side, the truck body may be open, to allow the dumping of refuse into the truck from its upper side at any location along the length of the truck body. Preferably, the interior of the truck body 11 is divided by a vertical transverse partition 12 into a forward compartment for receiving one type of refuse, and a rear compartment for receiving another type of refuse. The forward compartment may be rendered accessible for emptying by opening one or more of the side doors 13, which are suitably hinged to the truck body by hinges 14. To allow emptying of the rear compartment of the truck body, there are provided at the rear of the body a pair of doors 15 which are hinged to the truck body at its opposite sides respectively. (See hinges 16 in Fig. 2.)

The truck 10 may have a forward "tractor" portion 17 forming the cab within which the driver rides, and having the usual engine by which the truck is powered. The truck body 11 may take the form of a trailer section of the truck attached to and pulled by its forward tractor section 17. This trailer section is then provided with rear wheels 18, for co-acting with the wheels of the forward tractor section in movably supporting the truck on the road 19 or other support surfaces.

The refuse or other material being handled is first filled into several rectangular containers 20, each having four upstanding side walls and a bottom horizontal wall, and each being open at its upper side to receive and discharge the refuse. Each of these containers 20 has four wheels or casters 21 at its four corners so that the containers may be rolled along the surface 19 and onto and off of a movable holder 22 attached to the truck. This holder is pivotally carried by and attached to a movable carriage 23 which moves along a pair of tracks 24 on the truck body between the pick-up location of Fig. 2 and any of various dumping locations such as that shown typically in Fig. 1.

The carriage 23 includes two parallel opposite side plates 124 which lie in vertical planes which may coincide substantially with the planes of the two side walls 25 respectively of the truck body. The two side plates 124 are rigidly interconnected in some manner, as by a number of transverse parallel rods 26 extending between and connected at their opposite ends to side plates 124. The side plates 124 may have suitable ribs or flanges 27 projecting laterally from their outer sides for strengthening the plates 124 and for providing surfaces to which certain of the later-to-be described parts can be attached. Projecting upwardly from plates 124 (in their Fig. 2 positions), these plates may carry a pair of extension plates 28 lying in the planes of plates 124 and forming continuations of those plates.

The two tracks 24 which mount carriage 23 for movement relative to the truck body extend along opposite sides of the truck body and are mutually parallel. These two tracks 24 extend first directly upwardly at the opposite sides of the rear of the truck, and they then curve gradually at 29 to ultimately extend horizontally along the upper edges of the side walls of the truck and to the forward end of the truck body 11. These tracks may be of the essentially channel-shaped configuration represented in Fig. 6, to receive rollers 30 which are rotatably mounted to carriage 23, as by attachment to projections 31 attached to the opposite side plates 124 of the carriage. There are desirably two such rollers 30 at each side of the carriage 23, journaled about a pair of mounting shafts 32 attached to the carriage. The external cylindrical surfaces 33 of rollers 30 are, under different conditions, engageable with either of two opposed parallel surfaces 34 and 35 formed within track 24, to thus guide rollers 30 and the associated carriage 23 for movement along tracks 24 upwardly at the rear of truck body 11 and then horizontally along the upper side of the truck body to any desired dumping location at the top of the truck.

The carriage 23 is power-driven along tracks 24 by means of two endless flexible chains 36 at opposite sides of the truck. As seen best in Fig. 10, each of these chains 36 is connected at a first end 37 to one of the roller mounting projections 31 of carriage 23, and then extends upwardly from point 37 along and within the channel-shaped track 24, to curve within the track in correspondence with its curvature at 29, and to then extend horizontally along the upper horizontal portion of the track to the forward end of truck body 11. At the forward end of the truck body, each chain 36 passes about a drive sprocket 38, then passes the inner side of an idler sprocket 39, in advancing downwardly toward another idler sprocket or roller 40. From sprocket 40, the chain extends rearwardly about and between two drive sprockets 41 and 42, and then continues rearwardly to pass about three sprockets 43, 44 and 45. From sprocket 45, the chain advances upwardly to a point of connection at 46 to a lower portion of the projection 31 at the corresponding side of carriage 23. All of the various sprockets 38 to 45 may be rotatably mounted to the truck body at fixed locations, except for the sprocket 44 which is yieldingly urged by a spring 47 forwardly in a manner to take up a variable slack in the chain 36. Spring 47 may be attached at its forward end to a suitable lug 48 which is attached to and fixed relative to the truck body 11. At its rear end, spring 47 may be attached to a part 49 which pivotally carries sprocket 44.

For assuring proper support of the rearwardly projecting carriage 23, there may be provided a connector chain 50 and a coil spring 51 forming connections between chain 36 and lugs 52 and 53 formed on side plates 124 at locations rearwardly of the track-riding rollers 30. Chain 50 is a fixed connection and is attached at its opposite ends to lug 52 and a point 54 on chain 36. Spring 51 is attached at its opposite ends to lug 53 on the carriage and a point 55 on chain 36. A chain 50 and spring 51 of this type are of course provided at each side of the carriage.

Chains 36 are driven by the two sprockets 38 which engage the chains at the forward ends of tracks 24. As best seen in Fig. 11, these two sprocket wheels 38 are rigidly attached to the opposite ends of a common drive shaft 56 which is rotatably journaled by bearings 57 attached to truck body 11, and which rigidly carries a pair of sprocket wheels 58 near the center of shaft 56. These sprocket wheels 58 are driven by chains 59 whose lower ends extend about and are driven by sprockets 60 attached to the driven shaft of a hydraulically operated motor 61. This motor 61 is in turn driven by a flow of hydraulic fluid produced by a pump 62 which is driven by the engine 63 of the truck. Pump 62 takes suction from a reservoir represented at 64, and discharges through a line 65 to a multiple condition selector valve 66 which is actuated by a lever or handle 67. When handle 67 is in one position (say, the full line position of Fig. 12), the hydraulic fluid from pump 65 is fed through a line 68 to motor 61, to drive that motor in a predetermined first direction for advancing chains 36 and their associated carriage 23 in one direction along tracks 24 (for example, in a direction to advance the carriage in a clockwise direction as seen in Fig. 10). If handle 67 is then actuated to another position, say, the broken line position of Fig. 12, the hydraulic fluid from pump 62 is fed to motor 61 through a line 69, to drive motor 61 and the chains and carriage in a reverse direction, for returning the carriage toward its pick-up location. When handle 67 is in an intermediate or third position, between the two positions of Fig. 12, the valve 66 closes off the flow of hydraulic fluid to motor 61 through either of the lines 68 or 69, so that the mechanism is in a neutral condition and the carriage 23 will remain in any position to which it may have been moved. The frictional and hydraulic resistance offered by the various moving parts of the apparatus is such as to thus maintain the carriage in any position to which it may be moved.

The containers 20 are not mounted directly on carriage 23, but instead are supported on a holder structure 22, which is in turn pivotally attached to the carriage. Referring to Fig. 2, this holder structure may include two rearwardly projecting spaced parallel horizontal projections 70, and a shorter intermediate projection 170 parallel to projections 70, these three projections forming together a fork structure onto which the wheeled container 20 may be rolled. The two projections 70 are sufficiently close together to be received between the two pairs of wheels 21 at opposite sides of one of the containers 20. Therefore, the wheels 21 of the container may roll backwardly at opposite sides of the fork structure or platform structure formed by projections 70 and 170, and these projections 70 and 170 are so positioned as to then be received directly beneath the bottom wall 71 of container 20. Projecting downwardly from its bottom wall 71, each container 20 has three U-shaped rigid straps 72, forming with the bottom wall of the container, three passages adapted to receive and fit relatively closely about the three projections 70 and 170, to thus prevent container 20 from falling off of the projections when the holder 22 and the container are subsequently tilted downwardly at the dumping location.

The projections 70 and 170 of holder 22 may have upturned forward portions 73, which are perpendicular to the lower normally horizontal projections 70 and 170. These portions 73 are suitably rigidly interconnected, as by a rigid structure represented at 74 (see Fig. 2), to thus limit the forward movement of container 20 onto holder 22 by engagement of the forward wall of the container with members 73. For confining the container laterally, holder 22 may have at its opposite sides a pair of side plates 75, which are spaced apart a distance slightly greater than the width of container 20 transversely of the truck, and which are suitably rigidly attached to members 73 and the rest of the parts of the holder 22. When a particular container is positioned on holder 22, it may be retained against movement off of the lower fork structure 70—170 of that holder by means of a chain 76 attached at its opposite ends to plate 75 and extending about the rear side of container 20. As will be apparent, one end of this chain 76 may be detachable from the corresponding plate 75, to permit movement of container 20 on to and off of holder 22.

The holder 22 is mounted to carriage 23 for relative pivotal movement about an axis 77 extending horizontally and transversely of the truck body 11. For thus mounting holder 22, the two side plates of carriage 23 may have a pair of axially aligned bearings 78 (see Fig. 5), which receive and journal a pair of aligned laterally projecting stub shafts attached to and projecting in opposite directions from the two side plates 75 of holder 22. By virtue of this pivotal mounting of holder 22 to carriage 23, the holder 22 and a supported container 20 are mounted to swing relative to the carriage about horizontal axis 77 and between the position of Fig. 7 and the dumping position of Fig. 8. In Fig. 7, the holder 22 is in the same position relative to carriage 23 as in Fig. 1, but in Fig. 7 both of these parts (and the container 20) have moved to the top of the truck, to a position of support by the upper horizontal portions of tracks 24, rather than by the rear vertically extending portions of those tracks (as in Fig. 2). As the carriage 23 and holder 22 advance upwardly at the rear of the truck and then curve along curved portions 29 of tracks 24 to then advance along the upper horizontal portions of tracks 24, as to the Fig. 1 position, such advancement of the carriage and other parts from the vertical portions of the tracks to the horizontal portions acts to swing container 20 to the Fig. 7 position in which the open top 80 of container 20 faces directly forwardly of the truck, rather than upwardly as at the Fig. 2 pick-up location. When the holder 22 and container 20 then swing about horizontal axis 77 relative to carriage 23 to the Fig. 8 dumping position, the open top 80 of container 20 faces angularly downwardly, so that the trash or other contents of container 20 may fall from the container into the interior of truck body 11.

In the Fig. 7 position of container 20, the trash 81 is retained within the container by means of a retaining grill 82, formed of a number of spaced parallel bars 83, joined together at their opposite ends by a pair of transverse bars 84 and 85 extending parallel to axis 77. This grill 82 is mounted to automatically swing upwardly away from its trash-retaining Fig. 7 position in response to the downward swinging movement of holder 22 from the Fig. 7 position to the Fig. 8 position. For this purpose, the opposite ends of bar 84 of the grill 82 are pivotally attached at 86 to a pair of arms 87 which are rigidly attached to, and project angularly upwardly and forwardly from, the end plates 28 of carriage 23. These pivotal connections 86 mount grill-work 82 for pivotal movement relative to carriage 23 about the longitudinal axis of bar 84 (which axis extends parallel to transverse axis 77). The second transverse bar 85 of grill 82 is pivotally connected at its opposite ends 88 to first ends of a pair of links 89, whose second ends are pivotally connected at 90 to a pair of arms 91 which are rigidly attached to and project from plates 75 of holder 22. The pivotal movements at the opposite ends of links 89 are about two transverse axes which extend parallel to the axis 77, and to the axis of the pivotal connections 86. By virtue of this described linkage, the swinging movement of holder 22 relative to carriage 23 from the Fig. 7 position to the Fig. 8 position causes grill 82 to automatically swing upwardly and forwardly from its Fig. 7 position to its Fig. 8 position, so that the trash or other material contained within container 20 is entirely free to fall downwardly into the truck body when the parts are in their Fig. 8 positions.

When the carriage 23 is riding on the rear vertical portions of tracks 24, and with a container 20 positioned on holder 22, the holder 22 and container 20 act to automatically return to and remain in positions in which the open top 80 of container 20 faces directly upwardly; that is, the holder in this condition of the apparatus always remains in the position of Figs. 2 and 10 relative to carriage 23. In order to insure such positioning of holder 22 and container 20 when the carriage is riding on the rear vertical portions of track 24, the container 20 and holder 22 are purposely so formed that their over-all center of gravity will be located considerably to the left of the pivotal axis 77 of holder 22, and sufficiently to the left of that axis to swing the container 20 and holder 22 to the Fig. 10 position from any other possible position of these parts (as long as the carriage is riding on the rear vertical portions of tracks 24). For example, the common center of gravity of these parts may typically be located at 92 in Fig. 10.

When the carriage is in engagement with the upper horizontal portions of tracks 24, as in Figs. 1 and 7, the common center of gravity of holder 22 and container 20 is then shifted considerably to the right of (forwardly of) axis 77, as to the location represented at 92a in Fig. 7, so that the container and holder 22 will then automatically swing by gravity from the Fig. 7 position to the Fig. 8 dumping position, to thus dump the contents of container 20 into the truck. As the carriage and other parts then return along tracks 24 to the rear of the truck, and then move downwardly along the rear vertically extending portions of tracks 24, the center of gravity again shifts to the left of axis 77, to return the container and holder 22 to their upright Fig. 10 positions relative to carriage 23. Thus, the desired pivotal movement of holder 22 and container 20 relative to carriage 23, for dumping the contents of container 20, is effected entirely by gravity.

Until the container and other parts reach a desired dumping location at the top of the truck, the holder 22 and container 20 are retained in the Fig. 7 position relative to carriage 23 by means of two identical swinging latch elements 93, which are pivotally attached at first ends 94 to the two end plates 124 of carriage 23. Each of these latch elements 94 has a notch or recess 95 formed in the surface thereof which faces rearwardly in the Fig. 2 position of the apparatus. This notch 95 has a rounded inner portion which is adapted to exactly receive and retain a transverse pin 96 projecting laterally from and rigidly attached to the corresponding end plate 75 of holder 22. When latch element 93 is in the position of Figs. 3 and 7, with pin 96 received within its notch 95, the interengagement of latch element 93 and pin or shoulder 96 acts to positively retain holder 22 and container 20 in the Fig. 7 position relative to carriage 23. If the two latch elements 93 are then swung in a counter-clockwise direction, as seen in Fig. 7, to the Fig. 8 position, the pins 96 are then freed from recesses 95 of elements 93, to allow holder 22 and container 20 to swing by gravity to their Fig. 8 positions.

The movements of latch elements 93 are controlled by a pair of interconnected links or levers 97 and 98.

Link 97 is pivotally attached at 99 to the associated latch element 93, while link 98 is pivotally attached by a shaft 100 to end plate 124 of carriage 23. The inner ends of links 97 and 98 are pivotally interconnected by a pin and slot connection, including a pin 101 rigidly attached to link 98 (see Fig. 4) and projecting transversely (parallel to axis 77) through an elongated slot 102 which is formed in and extends longitudinally of link 97. This pin 101 projects laterally beyond link 97 for engagement by an actuating member, and may carry a flange 103 for holding links 97 and 98 laterally together. In the latched position of Figs. 3 and 7, link 98 is yieldingly urged in a clockwise direction about the axis of shaft 100 by a spring 106, to thereby cause the inner end 104 of link 98 to bear laterally against latch element 93 (to the left as seen in Fig. 3), to yieldingly hold element 93 in latched position. In this position, the axis of pin 101 may be advanced slightly beyond a center position; that is, it may be slightly to the left (as seen in Fig. 3) of a line 105 extending between the pivotal axes 99 and 100. The opposite ends of the coil spring 106 are connected to link 98 and end plate 124 of carriage 23 respectively, the spring being at all times maintained under sufficient tension to hold element 93 in latched position. In the position of Fig. 7, the pin 101 is located within the right end portion of slot 102, say, about ¼″ or ½″ from the upper end of the slot.

If pin 101 is swung downwardly from the Fig. 7 position to the Fig. 8 position, the initial part of this movement brings pin 101 into engagement with the right end of slot 102, following which any further downward movement of pin 101 pulls links 97 and element 93 downwardly to their Fig. 8 positions, to thus free pin 96 and the holder 22, as well as container 20, for swinging movement to their Fig. 8 dumping positions. The spring 106 remains above its center position in both the Fig. 7 and Fig. 8 positions; that is, the pivot point 100 remains lower than a line joining together the opposite ends of spring 106, so that the latch parts 93, 97 and 98 return to their Fig. 7 positions when released from their Fig. 8 positions.

The latch mechanism is actuated between its Fig. 7 and Fig. 8 positions by means of a hook element 109, which is attached to the upper end of an elongated pole 110, which pole is adapted to be held and manipulated by an operattor standing on the ground or road surface 19. Thus, the operator may release the latch, when the carriage and other parts are in an upper position such as that shown in Fig. 1, by merely pulling one of the pins 101 downwardly to the Fig. 8 position (by means of hook 109) to free the holder 22 and container 20 for dumping movement. In order that the release of one of the latch mechanisms, at one side of the carriage, may function also to simultaneously release the other latch mechanism, the two links 98 at opposite sides of the carriage are rigidly interconnected for movement in unison. For this purpose, the shaft 100 may be an elongated transverse rod which is connected at its opposite ends to links 98 respectively and is journaled appropriately within openings formed in the end plates 124 of carriage 123. Thus, the entire latch mechanism may be released by actuation of one of the pins 101 from either side of the truck body.

Referring now to Fig. 9, when the truck is travelling between different loading locations, it is desirable to lock the carriage and other parts in positions which are somewhat elevated above the pick-up location of Fig. 2. Accordingly, I provide on the track structures at opposite sides of the truck body a pair of supporting blocks 112, which contain notches 113 adapted to receive the pointed ends 114 of links 98, in a relation such that the notched portions of blocks 112 function as shoulders for positively supporting carriage 23 from blocks 112. In this Fig. 9 position, the counter-clockwise pivotal movement of elements 93 is limited by engagement of the latter with a pair of lugs 107 on end plates 124. When the carriage and holder are in their Fig. 9 positions, with no container 20 located on holder 22, and with latch elements 93 released and not retaining holder 22 in any set position, the center of gravity of holder 22 is so positioned as to cause the holder to swing to the Fig. 9 position relative to carriage 23, so that the fork-like projections 70 of holder 22 will project essentially upwardly, rather than rearwardly, and thus avoid any damage to other vehicles by these projections.

To now describe the operation of the illustrated apparatus, assume first that the carriage 23 and holder 22 are in the Fig. 2 positions, at the rear pick-up location, and that it is desired to place container 20 on the holder and dump its contents into the truck. With the carriage and holder in this Fig. 2 position, the container 20 may be rolled forwardly to a position of support by fork portions 70 and 170 of holder 22, with these projections 70 and 170 received within straps 72 and 172 at the under side of container 20. The chain 76 may then be fastened about the rear side of container 20, and attached at its opposite ends to end plates 75 of holder 22, to thus secure container 20 on the holder. In this condition, the latch elements 93 are of course engaged in holding relation with pins 96 to positively retain holder 22 in the Fig. 2 position relative to carriage 23.

After the container 20 has been secured to holder 22, the operator then actuates valve-controlling handle 67 (Fig. 12) from its neutral position to its full line position of Fig. 12, to cause hydraulic motor 61, driven by hydraulic fluid fed from pump 62 through valve 66, to commence upward movement of carriage 23 and the container 20 along tracks 24. More specifically, motor 61 drives chains 36 in a clockwise direction as seen in Fig. 10, with the drive between motor 61 and chains 36 being effected through parts 60, 59, 58, 56 and 38 of Figs. 10 and 11. The clockwise advancement of chains 36 causes carriage 23 and holder 22 and container 20 to move first vertically upwardly along the rear portions of tracks 24, and to then curve forwardly at 29, to ultimately advance forwardly along the horizontal upper portions of the tracks to a desired dumping location. This advancement of the carriage and container may be continued to any point along the open upper side of the truck, to dump into either the forward compartment or the rear compartment, and to dump into either of these parts at any desired point. Thus, the trash from a number of containers may be distributed evenly along the length of the truck body, to completely fill the truck. In this connection, it is noted that the rear doors 15 of the truck body have upper portions 115 which curve forwardly a short distance in correspondence with the contour of the body at 29, but which curved portions are short enough to avoid any interference with the filling of trash into the open upper side of the truck.

When the carriage and a carriage container reach a desired dumping location, such as the position shown in Figs. 1 and 7, the operator moves handle 67 to stop the advancement of the carriage, and the operator then manipulates pole 110 from the ground level 19 to pull one of the pins 101 downwardly to the Fig. 8 position, and thus release holder 22 and container 20 for swinging movement to the Fig. 8 dumping position. During the releasing movement of pins 101, the links 97 and 98 act essentially as a force multiplying toggle mechanism which exerts a relatively great releasing force against part 93 in response to the exertion of a much smaller force against pins 101. This of course allows the contents of container 20 to fall downwardly into the truck body 11. After the container has thus been dumped, the spring 106 returns latch parts 93, 97 and 98 to their Fig. 7 positions, although the container 20 and holder 22 will, at that point, still remain in their Fig. 8 positions. If the operator happens to pull pins 101 downwardly beyond the center position of the spring, that is, to a position in which the axis of shaft 100 is above a line joining the opposite ends of spring 106, then the operator may manually push pins 101 upwardly to the Fig. 7 position by means of an upturned portion 111 of hook 109.

Side plates 28 of carriage 23 act to retain the trash or other contents of container 20 against spilling laterally from the truck during a dumping action. After the dumping action, the operator actuates handle 67 to cause hydraulic motor 61 to return carriage 23 and the carried parts rearwardly along the upper horizontal portions of tracks 24, and then downwardly at the rear of the truck body toward the Fig. 2 position. As the carriage 23 curves downwardly at 29, the center of gravity 92 of holder 22 and container 20 moves to the left across the vertical plane within which axis 77 lies, to thus cause the holder 22 and container 20 to swing relative to carriage 23 to the position of Fig. 10. In swinging to this position, the latching pins 96 engage cam surfaces 115 formed at the undersides of lugs 116 on latch elements 93, to deflect elements 93 laterally to the right, and thus allow pins 96 to move into notches 95. The purpose of using a pin and slot connection at 101—102 instead of an ordinary pivotal connection is to allow longitudinal deflection of link 97 relative to link 98 when element 93 is deflected by pin 94 in the manner just described, to thus avoid any interference by parts 97 and 98 with the deflection of part 93. The springs 106 then return latch elements 93 to their holding positions of Figs. 2 and 10, to positively retain holder 22 and container 20 in the Fig. 10 upright position. When the carriage and holder reach the Fig. 2 position, container 20 may be removed rearwardly from the holder (after releaasing chain 76), and another filled container 20 may then be rolled onto the holder for dumping into the truck in the same manner as the first container. After all the containers 20 have been dumped into the truck, the final container is removed from holder 22, and the handle 67 is actuated to cause motor 61 to raise carriage 23 and holder 22 to their Fig. 9 positions, in which the operator may then manually release the latch elements 93 to the Fig. 9 positions, and move links 98 into engagement with notches 113, to support the apparatus in the Fig. 9 travelling position.

We claim:

1. A truck comprising a truck body containing a space for receiving a load and having an upper opening through which material may be filled into said space, track means on said body extending from a predetermined pick-up location upwardly to the top of the body, a carriage mounted for movement along said track means, a holder movably mounted to said carriage, a container which is completely separable from the truck and adapted to be filled with load material while separated therefrom and to then be moved onto said holder to a position of support thereby at said pick-up location, said container then being movable with the carriage and holder along the track means to a dumping location at the top of the truck body, power actuated means for moving said carriage, holder and container from the pick-up location to said dumping location, a connection mounting said holder to the carriage for relative pivotal movement in a direction to swing the container at said dumping location and thereby dump the contents of said container into the truck body, said track means extending first upwardly from said pick-up location and then generally horizontally at the top of the track body to thereby alter the orientation of the track riding carriage relative to said body, said pivotal connection being so located relative to the center of gravity of said holder and container that the container and holder will by gravity assume a first and upright position relative to the carriage when at the pick-up location, and will by gravity swing to a different position relative to the carriage when at said dumping location to thereby dump the contents of the container by gravity into the truck body, and a latch mechanism retaining the holder and container in said first position relative to the carriage and releasable when the carriage is at said dumping location to free the holder and container for swinging movement to dump the contents of the container into the truck body, said latch mechanism includes a pivotal latch element, and two pivotally interconnected links forming a connection for releasing the latch element and functioning as a toggle mechanism.

2. A truck as recited in claim 1, including a projection extending from one of said links, and a pole having an upper end adapted to engage and displace said pin in a direction to release said toggle mechanism.

3. A truck as recited in claim 1, in which one of said links bears laterally against said latch element in the active holding position of the latch element and in a relation retaining said latch element in said holding position.

4. A truck as recited in claim 1, including a spring urging said one link against said latch element.

5. A truck as recited in claim 1, including a pin and slot connection pivotally interconnecting said links and allowing limited relative movement thereof.

6. A truck as recited in claim 1, including a shoulder on said truck body engageable by one of said links to support the carriage relative to the body in a predetermined travelling position.

7. A truck comprising a truck body containing a space for receiving a load and having an upper opening through which material may be filled into said space, track means on said body extending from a predetermined pick-up location upwardly to the top of the body, a carriage mounted for movement along said track means, a holder movably mounted to said carriage, a container which is completely separable from the truck and adapted to be filled with load material while separated therefrom and to then be moved onto said holder to a position of support thereby at said pick-up location, said container then being movable with the carriage and holder along the track means to a dumping location at the top of the truck body, power actuated means for moving said carriage, holder and container from the pick-up location to said dumping location, a connection mounting said holder to the carriage for relative pivotal movement in a direction to swing the container at said dumping location and thereby dump the contents of said container into the truck body, said track means extending first upwardly from said pick-up location and then generally horizontally at the top of the track body to thereby alter the orientation of the track riding carriage relative to said body, said pivotal connection being so located relative to the center of gravity of said holder and container that the container and holder will by gravity assume a first and upright position relative to the carriage when at the pick-up location, and will by gravity swing to a different position relative to the carriage when at said dumping location to thereby dump the contents of the container by gravity into the truck body, and a latch mechanism retaining the holder and container in said first position relative to the carriage and releasable when the carriage is at said dumping location to free the holder and container for swinging movement to dump the contents of the container into the truck body, said latch mechanism including a latch element pivotally attached to said carriage, means forming a shoulder on said holder engageable by said latch element to releasably retain the holder against dumping movement, and two links pivotally connected toward first ends thereof to each other and toward second ends to said latch element and said carriage respectively and forming a toggle connection for releasing the latch element.

8. A truck as recited in claim 7, including a spring urging the one of said links which is connected to said carriage against said latch element in a direction to urge said element in a latching direction, and a pin and slot connection interconnecting said links toward said first ends thereof and allowing deflection of said latch element by said shoulder as the latter moves into latched engagement with said element when the container swings to said upright position.

9. A truck as recited in claim 8, including a second shoulder formed on the truck body and engageable by said one link at said first end thereof to support the carriage in a predetermined travel position, said spring being movable to an overcenter position when said one link is in engagement with said last mentioned shoulder.

10. A truck comprising a truck body containing a space for receiving a load and having an upper opening through which material may be filled into said space, track means on said body extending from a predetermined pick-up location upwardly to the top of the body, a carriage mounted for movement along said track means, a holder movably mounted to said carriage, a container which is completely separable from the truck and adapted to be filled with load material while separated therefrom and to then be moved onto said holder to a position of support thereby at said pick-up location, said container then being movable with the carriage and holder along the track means to a dumping location, at the top of the truck body, power actuated means for moving said carriage, holder and container from the pick-up location to said dumping location, a connection mounting said holder to the carriage for relative pivotal movement in a direction to swing the container at said dumping location and thereby dump the contents of said container into the truck body, said track means extending upwardly and then generally horizontally along the top of the truck, said container having an open upper side which is turned to face horizontally as the carriage moves horizontally along the top of the truck, a guard movably carried by the carriage and extending across said open upper side of the container to hold the contents therein, and means for swinging said guard relative to the carriage upwardly away from said open side of the container in response to pivotal dumping motion of the holder relative to said carriage.

11. A truck as recited in claim 10, in which said last mentioned means comprise a link connected at opposite ends to the guard and holder respectively, and a connection pivotally attaching said guard to said carriage at a location to be swung upwardly relative to the carriage in response to downward swinging movement of the holder and container in a dumping direction.

12. A truck as recited in claim 10, including a pair of side plates mounted to said carriage at opposite sides of the holder and container and positioned to confine the refuse against lateral dispersal as it falls from the container into the truck body.

13. A truck comprising a truck body containing a space for receiving a load and having an upper opening through which material may be filled into said space, track means on said body extending from a predetermined pick-up location upwardly to the top of the body and then along the top of the body to a dumping location, a carriage mounted for movement along said track means between said pick-up and dumping locations, a holder movably mounted to said carriage, a container adapted to be carried by said holder and which is completely separable from the truck and from said holder and is adapted to be filled with load material while separated from the holder and to then be moved onto said holder to a position of support thereby at said pick-up location, said holder having a portion projecting outwardly away from the truck body when the holder is at said pick-up location and forming a platform structure on the upper side of which said container is received and supported, said container then being movable with the carriage and holder along the track means first upwardly and then along the top of the body to said dumping location, power actuated means for moving said carriage, holder and container from the pick-up location to said dumping location, a connection mounting said holder to the carriage for relative pivotal movement in a direction to swing the container at said dumping location far enough toward an inverted position to dump the contents of said container into the truck body, means for holding the container against detachment from the holder during said swinging movement, said track means extending first upwardly from said pick-up location and then generally horizontally at the top of the truck body to thereby alter the orientation of the track riding carriage relative to said body, said pivotal connection being so located relative to the center of gravity of said holder and container that the container and holder will by gravity assume a first and upright position relative to the carriage when at the pickup location, and will by gravity swing to a different position relative to the carriage when at said dumping location to thereby dump the contents of the container by gravity into the truck body, and a latch mechanism retaining the holder and container in said first position relative to the carriage and releasable when the carriage is at said dumping location to free the holder and container for swinging movement to dump the contents of the container into the truck body.

14. A truck as recited in claim 13, including means for releasing said latch mechanism from a location at ground level.

15. A truck as recited in claim 13, including an elongated pole to be held by a person standing at ground level, and means carried at the upper end of said pole adapted to release said latch mechanism by manipulation of the pole.

References Cited in the file of this patent

UNITED STATES PATENTS

| | | |
|---|---|---|
| 1,780,064 | Buzzo | Oct. 28, 1930 |
| 1,820,526 | Caldwell | Aug. 25, 1931 |
| 2,456,434 | Manthie | Dec. 14, 1948 |
| 2,696,315 | Feidert | Dec. 7, 1954 |
| 2,808,161 | Gentile | Oct. 1, 1957 |